2 Sheets--Sheet 1.

W. CAIRNS.

Improvement in Cracker-Machines.

No. 133,014.  Patented Nov. 12, 1872.

Witnesses:  
Fred Haynes  
Ferd Furch

Inventor:  
W. Cairns.

AM. PHOTO-LITHOGRAPHIC CO. N.Y. (OSBORNE'S PROCESS.)

2 Sheets--Sheet 2.

W. CAIRNS.
Improvement in Cracker-Machines.

No. 133,014. Patented Nov. 12, 1872.

Witnesses:

Inventor:
Wm Cairns.

UNITED STATES PATENT OFFICE.

WILLIAM CAIRNS, OF JERSEY CITY, NEW JERSEY.

IMPROVEMENT IN CRACKER-MACHINES.

Specification forming part of Letters Patent No. 133,014, dated November 12, 1872.

*To all whom it may concern:*

Be it known that I, WILLIAM CAIRNS, of Jersey City, in the county of Hudson and State of New Jersey, have invented certain new and useful Improvements in Cracker-Machines; and I do hereby declare that the following is a full, clear, and exact description of the same, reference being had to the accompanying drawing forming part of this specification, and in which—

Figure 2:
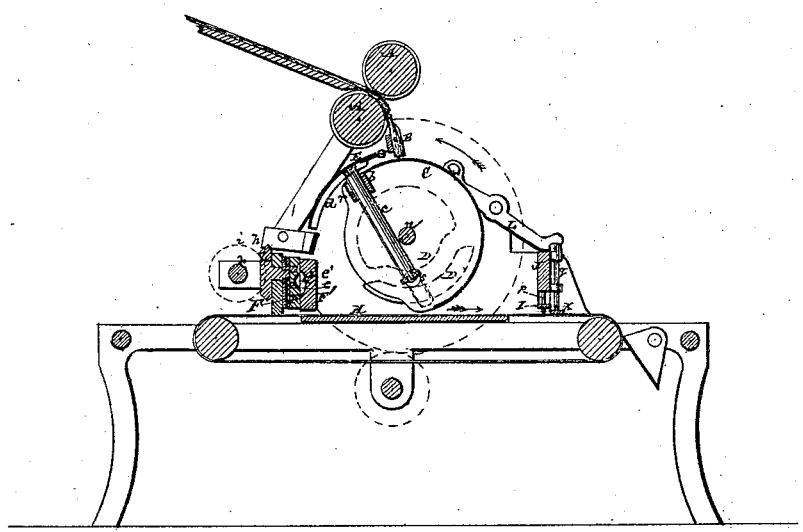
Figure 1:
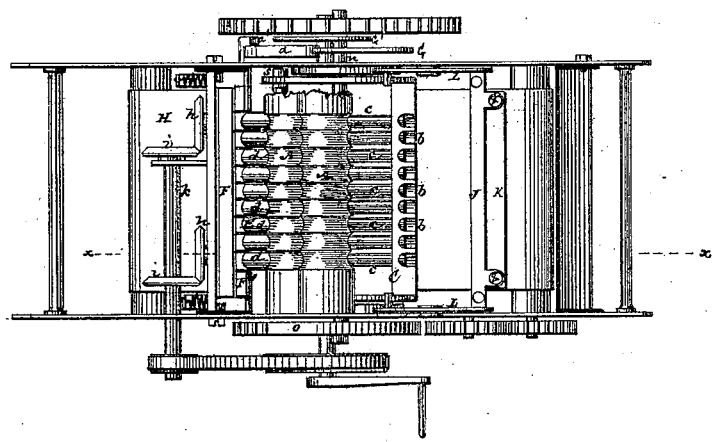
Figure 4:
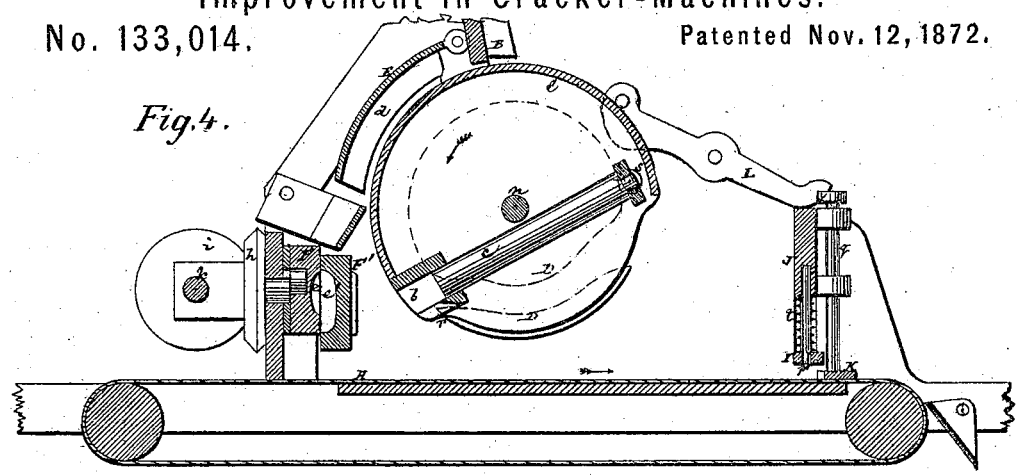
Figure 6:
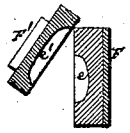
Figures 5, 7:
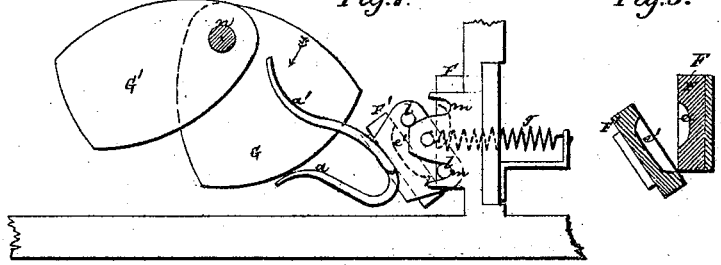
Figure 3:
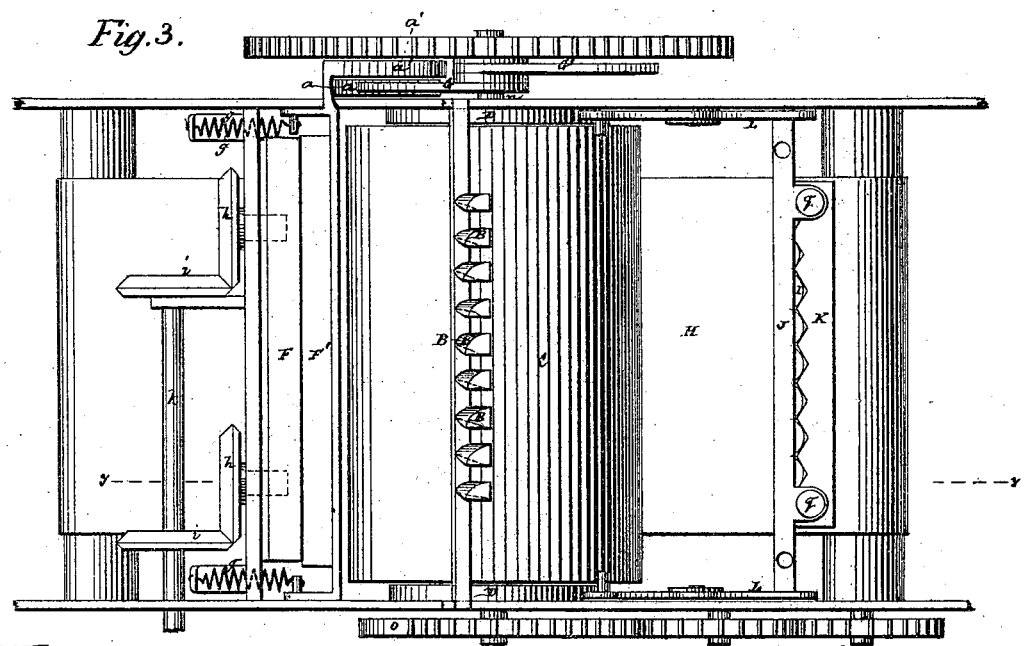

Figure 1 represents a plan of a cracker-making machine having my improvements applied; Fig. 2, a vertical longitudinal section at the line $x\,x$; Fig. 3, a plan, upon a larger scale, of the machine, omitting the feed-rollers and certain movable guides; Fig. 4, a vertical section at the line $y\,y$; Figs. 5 and 6, vertical sections of a pair of molding and kneading or pressing plates used in the machine in positions for receiving and discharging the dough; and Fig. 7, a view of the motion for operating one of the said plates.

Similar letters of reference indicate corresponding parts.

My invention consists generally in an organized machine for making crackers, in which the dough is rolled from a sheet into strips that are afterward turned on their edges and clipped by a cupped revolving segment, which delivers the clipped portions down movable guides, where they are rolled, and from which they are subsequently delivered into or between molding, kneading, and pressing plates and passed from thence onto an apron for further pressing action by the revolving segment, and finally conveyed against a pointed guide-plate, where the molded dough is docked or stamped, and subsequently passed off from the machine ready for baking.

Referring to the accompanying drawing, A A represent two grooved rollers, to which the dough is fed in a sheet, and by which, in passing through them, the dough is pressed into strips of an oval shape in their transverse section. These strips, as they are delivered by the rollers A A, pass down between spirally-formed guides B B, which serve to turn the strips on their edges or give them a quarter turn as it were. The rollers A A have an intermittent motion given them to thus feed or pass the strips of dough at intervals, as required, each feed passing a quantity of dough sufficient to make a cracker from each strip, and said feed being arranged in timely relation with a partial cylinder, C, arranged beneath the guides B B, and caused to revolve close to the lower ends of the latter. This segment or partial cylinder C is provided with cups $b\,b$ along its one or advance edge, corresponding in number and arrangement with the spaces between the spiral guides B B, and having their outer edges flush with the curved portion of the segment, also formed with open front sides. Arranged within these cups are plungers $c\,c$, forming movable bottoms to the cups, and worked in and out collectively at intervals, as required, by means of fixed cams D D at each end of the revolving segment C. These plungers $c\,c$ occupy an inward position as the cups $b\,b$, during the rotation of the segment C, approach the spaces between the spiral guides and the rollers A A, which may receive their intermittent feeding motion by a ratchet action derived from the revolving segment, make a feed of the turned strips of dough below the bottoms of the guides B B as the cups $b\,b$ approach, and pass beneath the spaces between the guides, thereby charging or filling the cups with dough, which is pinched from the strips and dropped in quantities sufficient to make a cracker in each cup by the back edges of the cups as the latter pass under the plate of guides B B. The segment C continuing its travel in the direction indicated by arrow in Fig. 2, the cups $b\,b$ next carry the dough, with which they are charged, under a hinged curved cap-plate, E, composed of or constituting movable guides $d$, corresponding in number and arrangement with the cups, and set over the segment C just back of the plate of spiral guides B B. The sliding plungers $c$ then move upward by means of the cams D and push the lumps of dough out of the cups into the pendent or movable guides $d$, along or down through which the lumps of dough are rolled—that is, between the curved or closed portion of the segment and the guides $d$, the latter rising or yielding to any inequality, and the dough thus rolled in detached quantities being ultimately dropped into or between cupped molding and kneading or pressing plates F F′, which are then in the position represented in Fig. 5—that is, open to receive the rolled lumps, but which afterward are closed, as shown in Figs. 2 and 4. These plates F F' contain cups or concaves e e', corresponding in number with the cups b b and guides f f, and are arranged across the machines below the guides f f, and with their cupped or concave surfaces opposite each other. Said plates are made to close, with the lumps of dough between them, by means of springs g g or any suitable device, and while the dough is thus pressed between them—that is, within their cups e e'—one of the plates F has a combined longitudinal and cross motion over or against the cupped face of the other plate, F', thereby moving the lumps of dough from side to side within the cups, and thus molding, kneading, and pressing them at the same time. The plate F may have its specified motion communicated to it by means of eccentrics on the arbors of two bevel-wheels, h h, revolved by bevel-wheels i i on a shaft, K, and the concaves e in said plate are made smaller than the concaves e' in the other plate, whereby the dough is prevented from passing the edges of the concaves. The other plate, F', has a double hinge or duplicate pivots, l l, at its end, arranged to alternately enter sockets or seats m m, accordingly as said plate is required to open above, as represented in Fig. 5, to receive the lumps of dough from the guides f f, or to open below, as shown in Fig. 6, to discharge the lumps after they have been worked between the two plates F F' when closed in relation with each other, as described. This reverse or alternate opening of the plate F' above and below may be produced at the required intervals by means of cams G G', on the shaft n of the segment C, acting successively against arms a a' attached to the back of the plate. Upon the plate F' opening to discharge, the molded lumps of dough are dropped upon a traveling endless apron, H. This apron has an intermittent motion in direction of the arrow, Figs. 2 and 4, which motion may be given it by a toothed segment, o, upon the cylinder-shaft, and suitable gearing arranged between said segment and one of the apron rollers, or by any other suitable means. Such apron having received the molded lumps of dough upon it starts and carries the molded dough under the closed or curved portion of the segment C. This produces pressure of the dough between the cylinder and the apron and gives to the detached lumps or pieces their required shape. From the segment C the dough is carried by the apron under a stationary clearer or discharge-plate, I, which is set over the apron just high enough to admit the molded dough to pass under it. This plate is perforated to admit of the stamps and docker or pricking and marking pins p working through it, said stamps and pins being carried by a docker-plate or cross-head, J, which moves up and down in grooves at each end, and the front of the cross-head J carrying two or more rods, g, which work freely in guides attached to the cross-head, and having secured to their bottoms a plate corrugated on its inner edge, the latter forming a corrugated or pointed guide-plate, K, which is set immediately outside or in front of the discharge-plate I. The cross-head J is first forced down part of the way by a cam-like portion, r, of the segment C acting upon a lever, L. This carries the guide-plate K down to the endless apron H, while the latter is in motion for the purpose of separating and retaining the molded dough in position to be docked or stamped. Subsequently the cross-head J is forced down the remaining distance, or far enough to force the stamps and docker-pins p through the stationary discharge-plate I into the molded dough beneath, after which the cross-head J is lifted, carrying with it the stamps and docker-pins, also the guide-plate K, which allows the molded dough to pass from beneath for further delivery, as required. The second downward action of the cross-head J is produced by a projecting end, s, of the sliding bar, which carries the plungers c, coming in contact with the lever L, and a spring, t, at opposite ends of the cross-head, serves to lift the latter again, and to hold it raised till again depressed.

What is here claimed, and desired to be secured by Letters Patent, is—

1. The combination of the longitudinally and transversely reciprocating molding-plate F having cups or concaves e with the molding-plate F' having concaves e', for operation upon the dough between them, substantially as specified.

2. The cupped molding-plate F', when hung to vibrate on its hinge relatively to its adjacent plate F, essentially as described and illustrated in Figs. 5, 6, and 7, of the drawing.

3. The revolving segment or partial cylinder C, in combination with the cups b b, the plungers c c, and movable guides d, substantially as specified.

4. The spiral guides B B, in combination with the grooved feed-rollers A A and revolving cupped segment C, essentially as described.

5. The movable cross-head J, carrying the stamps or docker-pins, in combination with the discharge-plate I and corrugated guide-plate K, all constructed and operating substantially as specified.

WM. CAIRNS.

Witnesses:
FRED. HAYNES,
FERD. TUSCH.